(12) United States Patent
Birch

(10) Patent No.: US 7,529,353 B2
(45) Date of Patent: May 5, 2009

(54) USING A VOICE EXTENSIBLE MARKUP LANGUAGE BROWSER TO IMPLEMENT AN ADVANCED INTELLIGENT NETWORK INTELLIGENT PERIPHERAL

(75) Inventor: Oliver Birch, Annapolis, MD (US)

(73) Assignee: International Business Machines Corporation, Armonk, NY (US)

( * ) Notice: Subject to any disclaimer, the term of this patent is extended or adjusted under 35 U.S.C. 154(b) by 1001 days.

(21) Appl. No.: 10/840,171

(22) Filed: May 6, 2004

(65) Prior Publication Data

US 2005/0265541 A1 Dec. 1, 2005

(51) Int. Cl.
*H04M 1/64* (2006.01)

(52) U.S. Cl. ............... 379/88.03; 379/221.08; 379/221.09

(58) Field of Classification Search ............... 379/88.03, 379/88.17
See application file for complete search history.

(56) References Cited

U.S. PATENT DOCUMENTS

| | | | | |
|---|---|---|---|---|
| 5,917,817 | A * | 6/1999 | Dunn et al. ............. | 370/352 |
| 6,490,564 | B1 | 12/2002 | Dodrill et al. | |
| 7,336,771 | B2 * | 2/2008 | Crockett et al. ......... | 379/88.03 |
| 7,340,043 | B2 * | 3/2008 | Crockett et al. ......... | 379/88.17 |
| 2002/0198719 | A1 | 12/2002 | Gergic et al. | |
| 2004/0111269 | A1 * | 6/2004 | Koch .................... | 704/275 |
| 2004/0186901 | A1 * | 9/2004 | Guigui .................. | 709/217 |

OTHER PUBLICATIONS

Juliana Freire et al., "WebViews: Accessing Personalized Web Content and Services", pp. 576-586, 2001.

* cited by examiner

*Primary Examiner*—Ahmad F Matar
*Assistant Examiner*—Khai N Nguyen
(74) *Attorney, Agent, or Firm*—Gibb I.P. Law Firm, LLC

(57) ABSTRACT

A method and structure for providing a voice dialogue in a telephone network that includes initiating a telephone call, routing the telephone call to a voice processor based upon a call control protocol, and converting the call control protocol to a voice extensible markup language. More specifically, this process first directs a telephone call to a switch. The switch requests routing instructions from a control point and routes the telephone call to a voice extensible markup language (XML) browser according to the routing instructions. Next, the invention forwarding a request for voice instructions from the XML browser to a call control protocol to voice XML converter. The invention converts the request for voice instructions to the call control protocol using the converter and forwards the request for voice instructions from the converter to the control point. The control point returns voice instructions to the converter, and the converter, in turn, converts the voice instructions from the call control protocol to the voice XML. This process next returns voice instructions from the converter to the voice XML browser and the XML browser executes the voice instructions using the XML browser.

3 Claims, 4 Drawing Sheets

USING A VOICE EXTENSIBLE MARKUP LANGUAGE BROWSER TO IMPLEMENT AN ADVANCED INTELLIGENT NETWORK INTELLIGENT PERIPHERAL

BACKGROUND OF THE INVENTION

1. Field of the Invention

The invention generally comprises a system for providing a voice dialogue in a telephone network and more particularly to a system that includes a voice markup language browser connected to the switching points.

2. Description of the Related Art

In order to provide enhanced telephone services, many telephone companies now implement a telephone communications network as an Advanced Intelligent Network (AIN) which has made it easier to provide a wide array of previously unavailable telephone service features. In an AIN system, telephone central offices, each of which serves as a signal switching point (SSP), detect one of a number of call processing events identified as AIN "triggers." An SSP which detects a trigger suspends processing of the call which activated the trigger, compiles a call data message and forwards that message via a common channel interoffice signaling (CCIS) link to a database system, such as a Service Control Point (SCP). The SCP may be implemented as part of an integrated service control point (ISCP). If needed, the SCP can instruct the central office (SSP) at which the AIN trigger was activated to obtain and forward additional information, e.g., information relating to the call. Once sufficient information about the call has reached the ISCP, the ISCP accesses stored call processing information or records (CPRs) to generate from the received message data, a call control message. The call control message is then used to instruct the central office on how to process the call which activated the AIN trigger.

As part of the call control message, an ISCP can instruct the central office to send the call to an outside resource, such as an intelligent peripheral (IP) using a send to outside resource (STOR) instruction. IPs are frequently coupled to SSPs to provide message announcement capabilities, voice recognition capabilities and other functionality which is not normally provided by the central office. The control message is normally communicated from the ISCP to the SSP handling the call via the CCIS link. Once received, the SSP completes the call in accordance with the instructions received in the control message (see U.S. Pat. No. 6,690,772, incorporated herein by reference).

SUMMARY OF THE INVENTION

In its most basic form, this disclosure presents a method of providing a voice dialogue in a telephone network that includes initiating a telephone call, routing the telephone call to a voice processor based upon a call control protocol, and converting the call control protocol to a voice extensible markup language. More specifically, this process first directs a telephone call to a switch. The switch requests routing instructions from a control point and routes the telephone call to a voice extensible markup language (XML) browser according to the routing instructions. Next, the invention forwarding a request for voice instructions from the XML browser to a call control protocol to voice XML converter. The invention converts the request for voice instructions to the call control protocol using the converter and forwards the request for voice instructions from the converter to the control point. The control point returns voice instructions to the converter, and the converter, in turn, converts the voice instructions from the call control protocol to the voice XML. This process next returns voice instructions from the converter to the voice XML browser and the XML browser executes the voice instructions using the XML browser.

Thus, the voice processor (browser and converter) provides voice communications between a telephone user and a machine. Note that the call control protocol may not be publicly (or widely) available, while the voice extensible markup language is widely publicly available.

The inventive system for providing such a voice dialogue in a telephone network comprises a switching point connected to a communication device, a service control point connected to the switching point, and a voice processor connected to the service control point and to the switching point. The voice processor communicates with the service control point using a call control protocol. The voice processor comprises a voice markup language browser connected to the switching point and a converter connected to the service control point and the voice markup language browser. The converter is adapted to convert the call control protocol to a voice extensible markup language. The service control point is connected to the switching point over an advanced intelligent network. Therefore, the voice markup language browser comprises an intelligent peripheral.

These, and other, aspects and objects of the present invention will be better appreciated and understood when considered in conjunction with the following description and the accompanying drawings. It should be understood, however, that the following description, while indicating preferred embodiments of the present invention and numerous specific details thereof, is given by way of illustration and not of limitation. Many changes and modifications may be made within the scope of the present invention without departing from the spirit thereof, and the invention includes all such modifications.

BRIEF DESCRIPTION OF THE DRAWINGS

The invention will be better understood from the following detailed description with reference to the drawings, in which.

DETAILED DESCRIPTION OF PREFERRED EMBODIMENTS OF THE INVENTION

Figure 1:
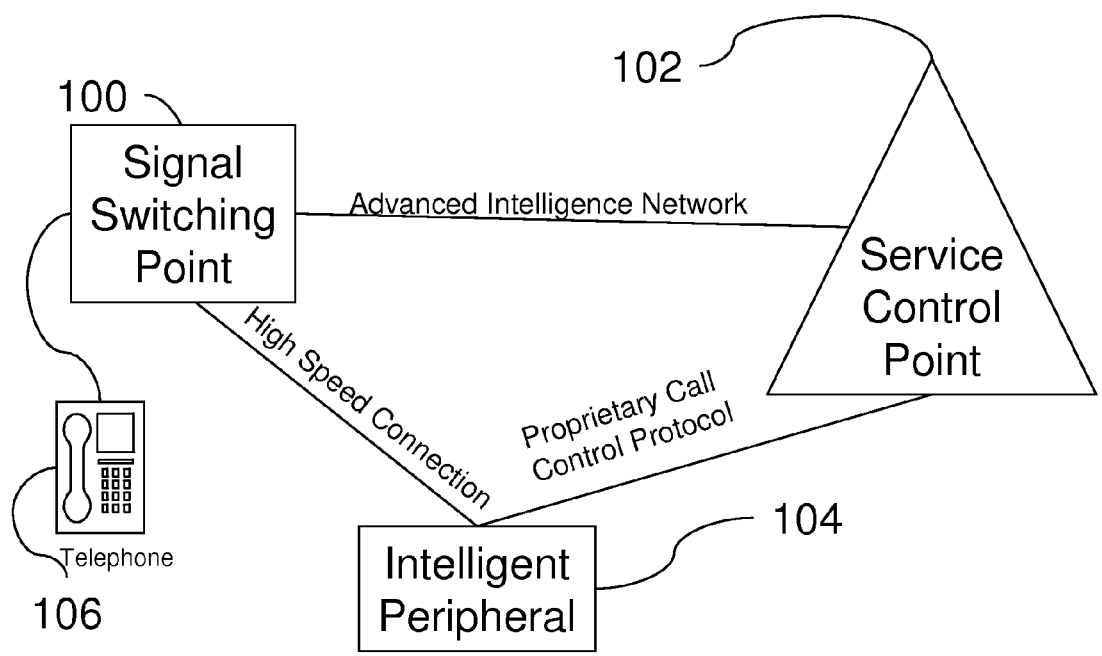
FIG. 1 is a schematic diagram of a telephone system.

The present invention and the various features and advantageous details thereof are explained more fully with reference to the nonlimiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the present invention. The examples used herein are intended merely to facilitate an understanding of ways in which the invention may be practiced and to further enable those of skill in the art to practice the invention. Accordingly, the examples should not be construed as limiting the scope of the invention.

The disclosure explains how to implement an IP (Intelligent Peripheral) using a standard VoiceXML browser. In the AIN (Advanced Intelligent Network) architecture shown in FIG. 1, an IP 104 connects to an SCP (Service Control Point) 102 using a proprietary call control protocol, such as SR-3511 (as defined by Telcordia, Piscataway, N.J., USA). In the past, IPs were specialized pieces of equipment available from the few vendors that had AIN expertise. The invention includes a proprietary call control protocol to VoiceXML converter that allows a standard VoiceXML browser to be used as an IP. The IP can then be implemented using standard equipment from vendors that do not implement proprietary call control protocol and do not have AIN expertise.

More specifically, FIG. 1 is a block diagram that schematically illustrates a wired or wireless communication device 106 in a telephone network that is configured for provision of IN services. While the communication device 106 shown in the drawings is a telephone, the invention is applicable to any device capable of voice communication, including but not limited to cellular phones, land line phones, wireless phones, voice enabled personal digital assistants (PDAs), voice enabled computers, etc. The telephone is directly or indirectly connected to a signal switching point 100, receiving signaling and voice communications from the communication device 106, and transferring the communications to other network elements in order to complete and carry out calls made by or to the communication device 106.

The signal switching point 100 provides basic switching capabilities, including the means to establish, manipulate and release calls and connections. When signaling passing through the signal switching point 100 is related to an IN service, the call is suspended temporarily and control of the call is passed to the service control point (SCP) 102. Communications between SSP 100 and SCP 102 are based on a standard IN Application Protocol (INAP). The SCP 102 processes the call, and then sends instructions back via INAP to SSP 100 as to how the call should be handled.

One basic idea of IN is to move intelligent services out of the network switches to separate service points, such as SCP 102. Multiple SCPs may communicate with a given signal switching point, or the switch can be programmed to choose the SCP for each call depending on the trigger parameters. Similarly, a single SCP can communicate with and service multiple SSPs (although not all the switches in a network are necessarily IN-enabled). The unified IN architecture allows different service providers to create SCPs and IPs that implement their own particular services, independent of the underlying network technology.

For example, assuming SCP 102 is responsible for provision of telephone voice playback/data acquisition related services, the signal switching point 100 will refer calls to the SCP 102, which analyzes the calls using its own service logic and then returns instructions to the SSP 100 to forward the voice playback/data acquisition related calls to the intelligent peripheral 104. The IP 104 functions could include, for example, playing prerecorded or synthesized voice responses to the communication device 106, or capturing voice responses, Dual Tone Multi-Frequency ("DTMF") responses, etc. from the communication device 106. These IP functions are usually controlled by commands from the SCP 102 using a proprietary call control protocol, such as SR-3511 (Telcordia).

However, because the intelligent peripheral performs its logical operations under a proprietary call control protocol that is highly specialized with respect to the advanced intelligent network, those who are not trained with respect to the nuances of advanced intelligent networks, as well as those who do not have access to the privately held proprietary call control protocol will not be able to design an intelligent peripheral. In other words, because the system shown in FIG. 1 requires that the designer of the intelligent peripheral be fluent with the proprietary call control protocol as well as advanced intelligent networks, the number of providers of such intelligent peripherals is substantially limited.

Figure 2:
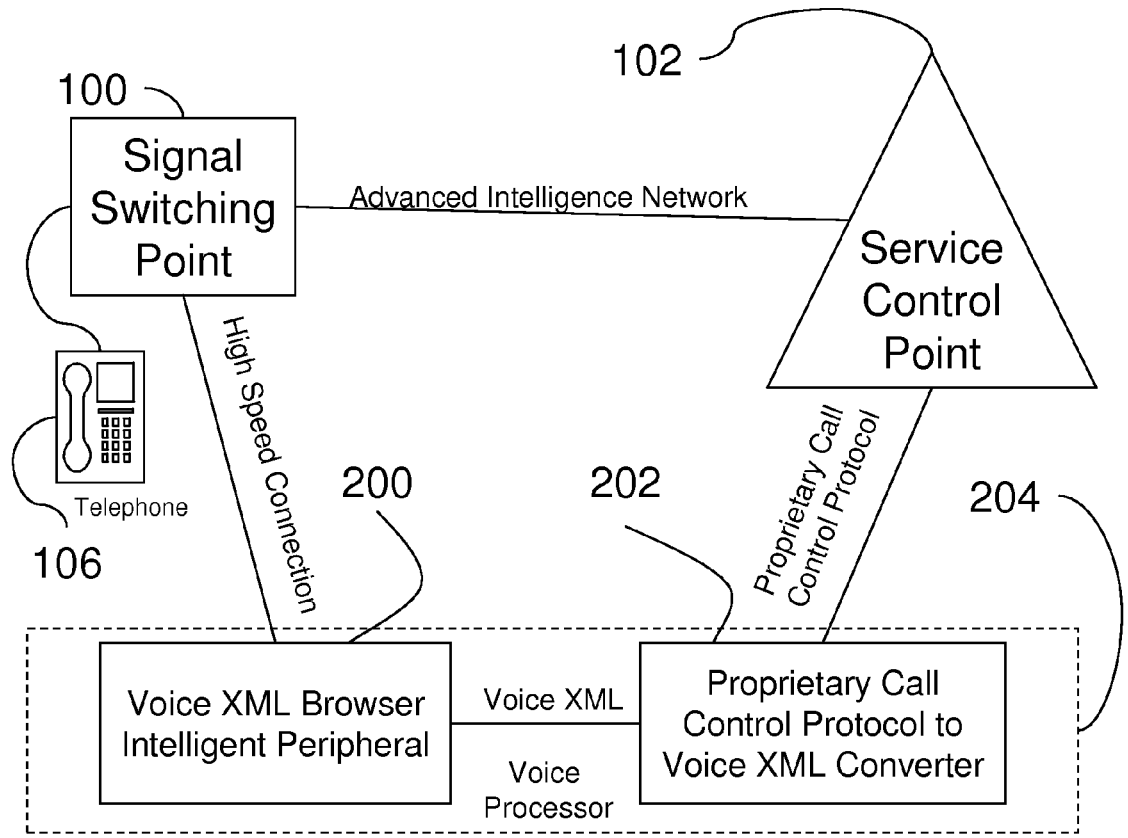
FIG. 2 is a schematic diagram of a telephone system.

Therefore, the invention provides the proprietary call control protocol to voice extensible markup language (XML) converter 202 shown in FIG. 2. The proprietary call control protocol to voiceXML converter is designed to communicate with the service control point 102 using the proprietary call control protocol, and to communicate with the voice XML browser 200 using voice XML protocol. The details of the proprietary call control protocol to voiceXML converter 202 are shown in FIG. 3.

The combination of the voice XML browser 200 and the proprietary call control protocol to voice XML converter 202 creates a voice processor 204 allows any voice command passing from the signal switching point 100 to be properly communicated with the service control point 102 even though the service control point operates under the proprietary call control protocol.

Figure 3:
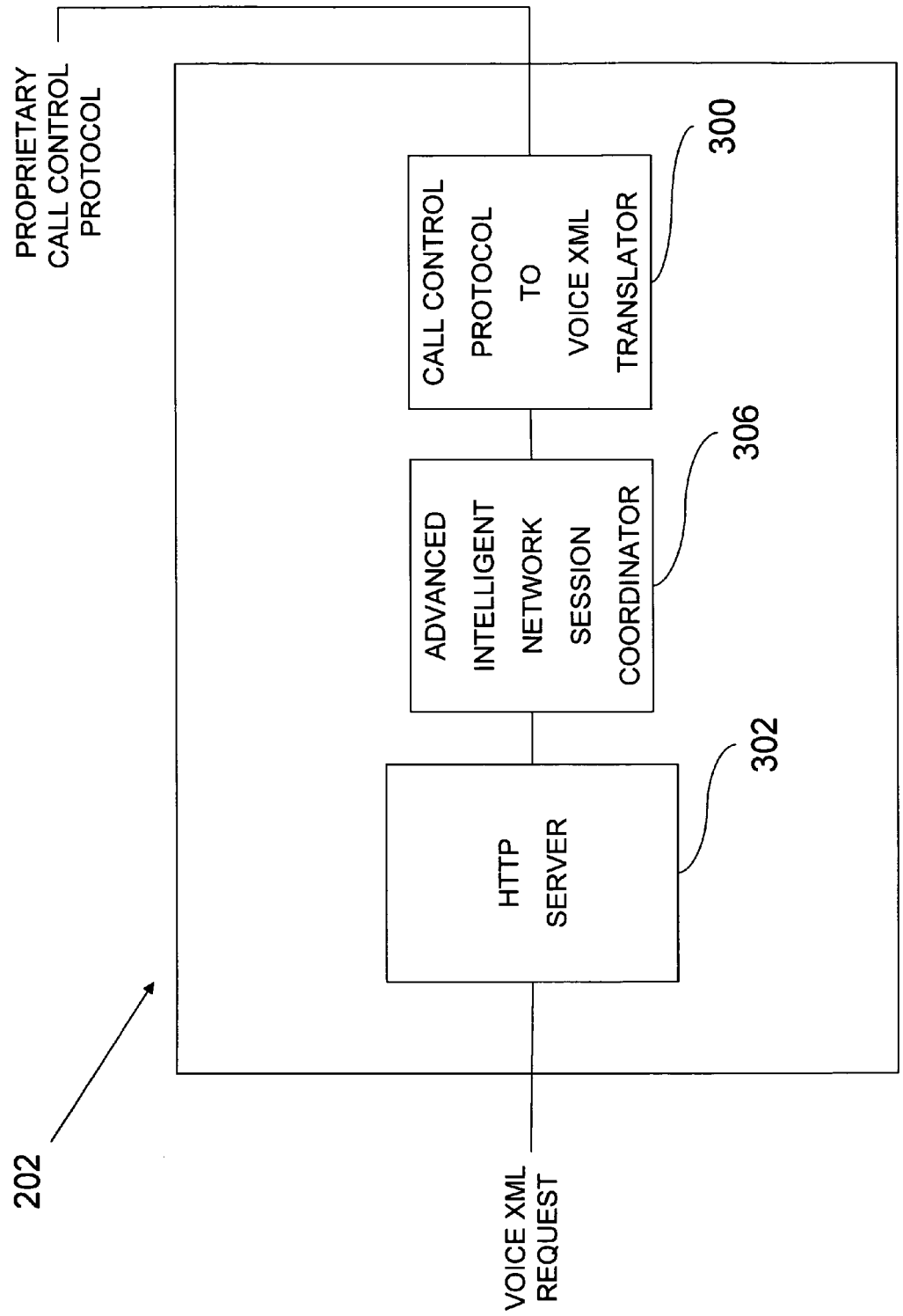
FIG. 3 is a schematic diagram of the converter shown in FIG. 2.

More specifically, as shown in FIG. 3, the proprietary call control protocol to Voice XML converter 202 includes the following logical components. The Advanced Intelligent Network Session Coordinator 306 receives a request for Voice XML via the HTTP server 302, which it translates into a Provide Instruction request to the SCP. When the SCP responds, the Call Control Protocol to Voice XML Translator 300 is used to build a Voice XML page that is returned to the Voice XML Browser via the HTTP server. An example of a translation is from the proprietary Play Announcement instruction to the Voice XML <prompt> instruction. Another example is from Play Announcement and Collect Digits to <prompt> plus an appropriate DTMF input grammer. These examples are for illustration only. (Also, the logical components are listed to assist in the explanation of the invention and do not specify a single possible implementation; actual modules used to build the invention could be organized differently to achieve the same result.) The result of the Call Control Protocol instruction is sent to the Advanced Intelligent Network Session Coordinator by an HTTP request programmed into the Voice XML. It translates this and sends it to the SCP.

The structure shown in FIG. 2 allows the intelligent peripheral to be manufactured as a voice XML browser. Therefore, one who is not skilled in the art of advanced intelligent networks and/or one who does not have access to the (sometimes privately held) proprietary call control protocol can still create an intelligent peripheral with the invention. This occurs because the proprietary call control protocol to voice XML converter 202 provides a conventional widely available, public voice XML interface and operates in the well known and publicly available voice XML protocol. Thus, the invention allows substantially more individuals and companies to create intelligent peripherals for use with advanced intelligent networks than was previously possible. This, in turn, increases the diversity of intelligent peripherals that are provided and decreases the cost of the intelligent peripherals.

Figure 4:
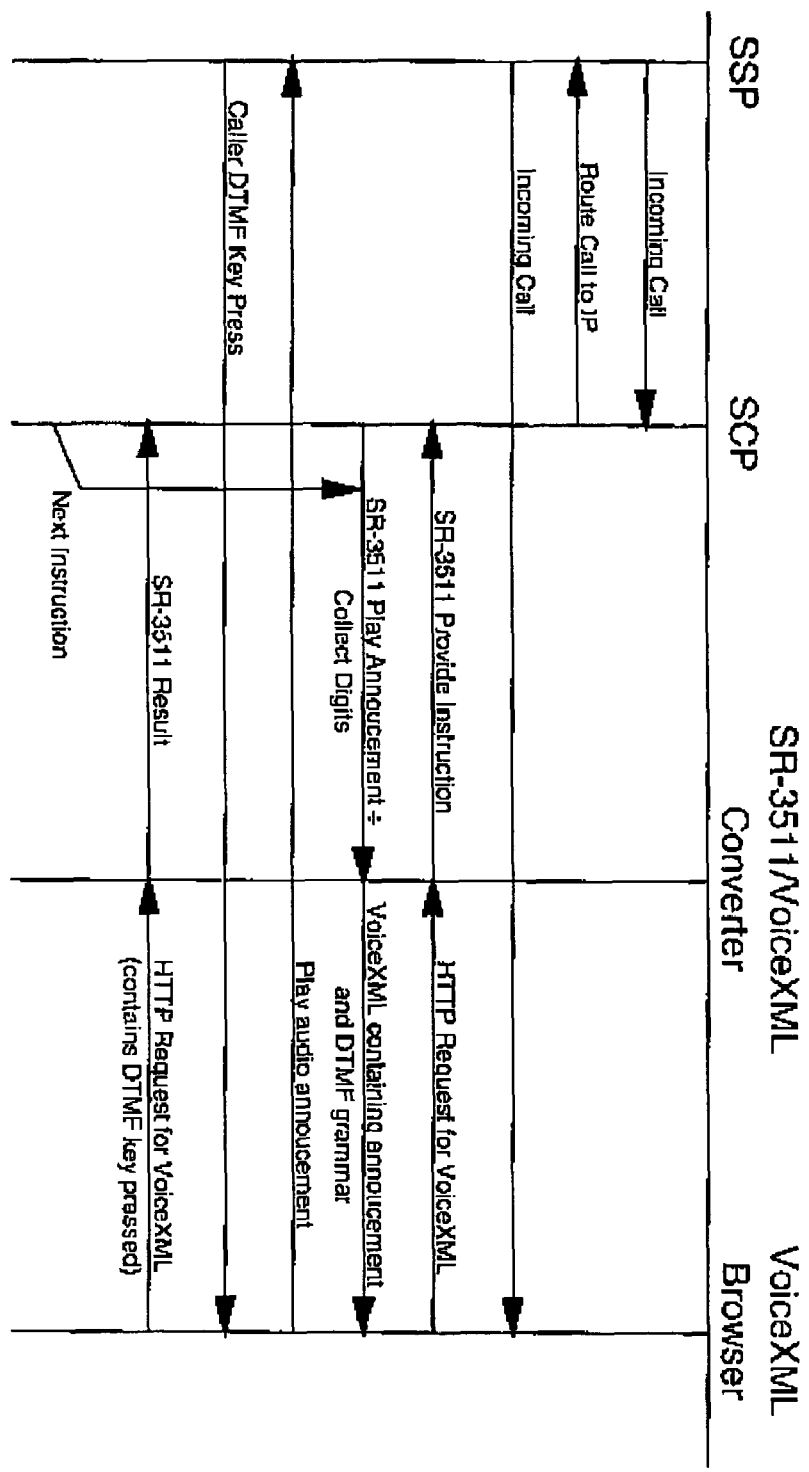
FIG. 4 is a flow diagram illustrating one aspect of the invention.

The call flow shown in FIG. 4 illustrates one example of how a call can be processed with the invention. More specifically, a call is first routed by the service provider to an SSP 100. The SSP 100 requests an SCP 102 to complete the call (first arrow in FIG. 4). The SCP 102 instructs the SSP 100 to route the call to the IP 200 (second arrow in FIG. 4). The VoiceXML browser intelligent peripheral 200 receives the call (third arrow in FIG. 4). The VoiceXML browser 200 does not need to do any special call processing, it just requests VoiceXML from a HTTP Server 302 in the proprietary call control protocol to voice XML converter 202 (HTTP request for a voice XML in FIG. 4). In this case, the proprietary call control protocol to voice XML converter 202 acts as the HTTP Server. The converter receives the request for VoiceXML and issues a proprietary call control protocol request for instructions to the SCP 102 (SR-3511 provide instruction, in FIG. 4). When the SCP 102 responds (with, for example, a SR-3511 instruction to play an announcement and collect digits in FIG. 4), the proprietary call control protocol to voiceXML converter 202 dynamically builds a VoiceXML page, using page builder 304 (for example, a voice XML page containing announcement and DTMF grammar, in FIG. 4), based on the instructions specified by the SCP 102. The proprietary call control protocol to voice XML converter 202 sends the page back to the VoiceXML browser 200 via the HTTP server 302 as the HTTP response to the HTTP request made previously. The VoiceXML browser 200 executes the VoiceXML (instruction to play audio announcement in FIG. 4). The signal switching point 100 responds to the audio announcement (for example, the caller presses the DTMF keys in FIG. 4). The voice XML browser 200 returns this result to the proprietary call control protocol to voiceXML converter 202, which in turn forwards the result to the SCP 102. Processing then returns to see whether additional instructions are to be issued by the SCP. Thus, the voice XML browser acts just as it would in executing any standard VoiceXML, but in effect is executing the instructions from the SCP and is acting as an IP.

While the SR-3511 protocol is used in the example shown in FIG. 4, the invention is not limited to this protocol and instead is applicable to any protocol that is not publicly available or widely understood, whether now in use, or developed in the future. In addition, while a voice XML protocol and browser are discussed above, the invention is not limited to these specific protocols. Instead, the invention is broadly applicable to all advanced intelligent networks used for communication that involves a highly specialized or secretly held protocol. Through the use of the inventive converter, the invention converts the private protocol to a public protocol to allow standard devices (such as the voice XML browser 200 to be used). The inventive architecture allows a standard VoiceXML browser 200 to be used as an IP through the use of an SR-3511 to VoiceXML Converter 202.

Figure 5:
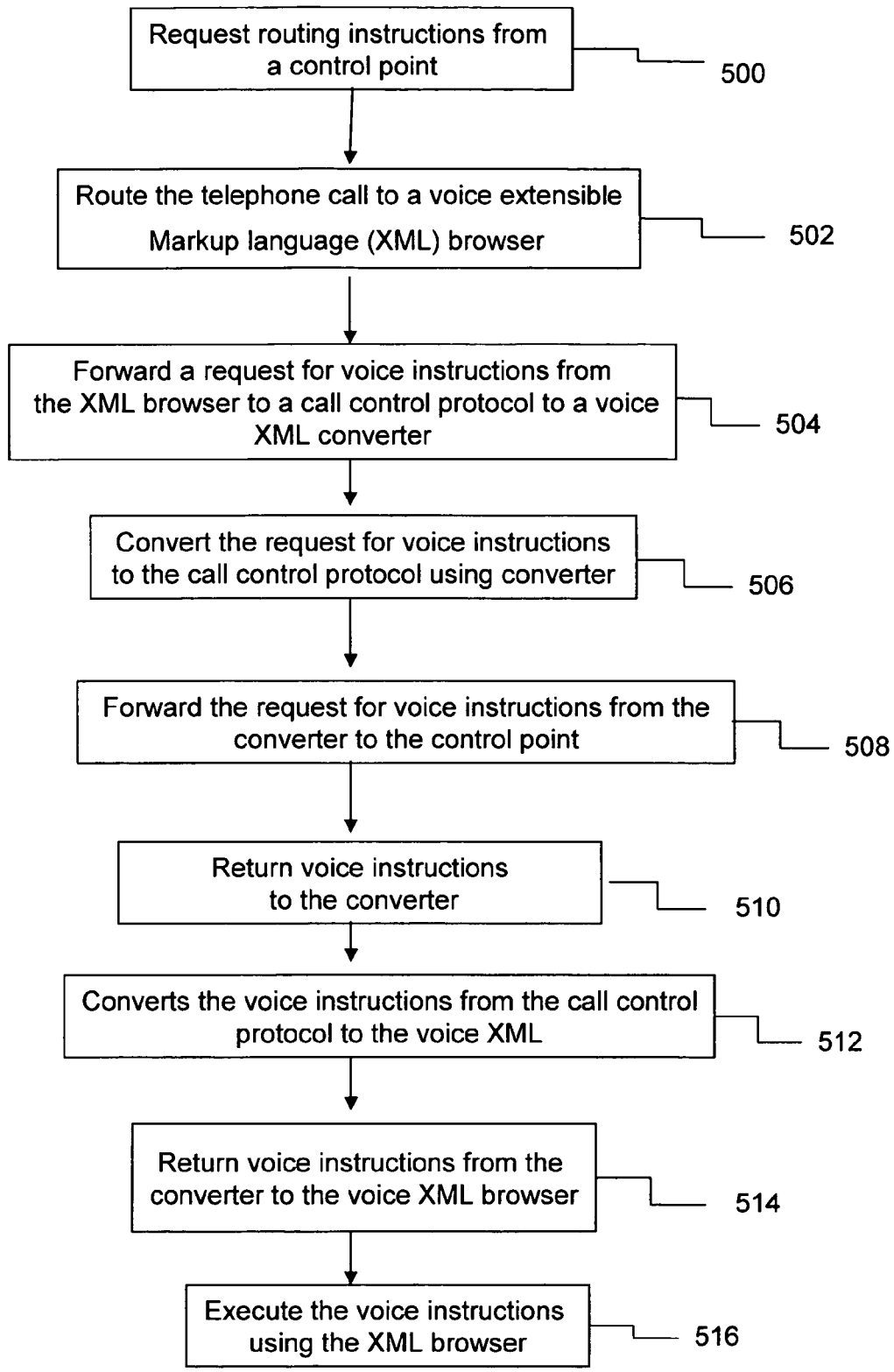
FIG. 5 is a flowchart diagram illustrating one aspect of the invention.

More specifically, this process first directs a telephone call to a switch as shown in FIG. 5. The switch requests routing instructions from a control point (500) and routes the telephone call to a voice extensible markup language (XML) browser (502) according to the routing instructions. Next, the invention forwards a request for voice instructions from the XML browser to a call control protocol to voice XML converter (504). The invention converts the request for voice instructions to the call control protocol (506) using the converter and forwards the request for voice instructions from the converter (510) to the control point. The control point returns voice instructions to the converter, and the converter, in turn, converts the voice instructions from the call control protocol to the voice XML (512). This process next returns voice instructions from the converter to the voice XML browser (514) and the XML browser executes the voice instructions using the XML browser (516).

The inventive architecture builds on open and standard technology that is widely available. VoiceXML is used in many different voice solutions and is used across industries as opposed to SR-3511, which is only used in the AIN environment. Thus, the invention lowers the cost of the technology and allows for a broader selection of vendors to be used. Also, since the IP in the proposed architecture is based on VoiceXML, extensions to the proprietary call control protocol, can use the features available in VoiceXML in addition to what is defined in the proprietary call control protocol. This has the added advantage that these extensions are in a standard language and could be used by multiple VoiceXML browser vendors and in multiple AIN implementations.

The structure shown in FIG. 2 allows the intelligent peripheral to be manufactured as a voice XML browser. Therefore, one who is not skilled in the art of advanced intelligent networks and/or one who does not have access to the (sometimes privately held) proprietary call control protocol can still create an intelligent peripheral with the invention. This occurs because the proprietary call control protocol to voice XML converter 202 provides a conventional widely available, public voice XML interface and operates in the well known and publicly available voice XML protocol. Thus, the invention allows substantially more individuals and companies to create intelligent peripherals for use with advanced intelligent networks than was previously possible. This, in turn, increases the diversity of intelligent peripherals that are provided and decreases the cost of the intelligent peripherals.

The proposed architecture builds on open and standard technology that is widely available. It can be implemented on a variety of platforms and operating systems in a variety of programming languages. Extensions to SR-3511 can quickly and easily be implemented in addition to the base specification, for example Extended Info From Resource. The proposed architecture could also be used to implement IP functionality through conversion to other speech interaction markup languages such as SALT.

While the invention has been described in terms of preferred embodiments, those skilled in the art will recognize that the invention can be practiced with modification within the spirit and scope of the appended claims.

What is claimed is:

1. A method of providing a voice dialogue in a telephone network, said method consisting of:
   initiating a telephone call;
   routing said telephone call to a voice processor based upon a call control protocol, wherein said voice processor provides voice communications between a telephone user and a machine, wherein said routing process routes said telephone call to a voice extensible markup language browser, and wherein said call control protocol is not publicly available and said voice extensible markup language is publicly available; and
   converting said call control protocol to a voice extensible markup language, wherein said converting process is performed by a converter connected to said browser, and wherein said converting process comprises using a Hypertext Transfer Protocol (HTTP) server, using an Advanced Intelligent Network Session Coordinator, and using a Call Control Protocol to Voice Extensible Markup Language (XML) Converter.

2. A method of providing a voice dialogue in a telephone network, said method consisting of:
   directing a telephone call to a switch;
   requesting, by said switch, routing instructions from a control point;
   routing said telephone call to a voice Extensible Markup Language (XML) browser according to said routing instructions, wherein said routing process routes said telephone call to a voice extensible markup language browser;
   forwarding a request for voice instructions from said XML browser to a call control protocol to voice XML converter, wherein said call control protocol is not publicly available and said voice extensible markup language is publicly available, converting said request for voice instructions to said call control protocol using said converter, wherein said converting process is performed by a converter connected to said browser, and wherein said converting process comprises using a Hypertext Transfer Protocol (HTTP) server, using an Advanced Intelligent Network Session Coordinator, and using a Call Control Protocol to Voice XML Converter;

forwarding said request for voice instructions from said converter to said control point;

returning voice instructions from said control point to said converter;

converting said voice instructions from said call control protocol to said voice XML;

returning voice instructions from said converter to said voice XML browser; and executing said voice instructions using said XML browser.

3. The method in claim 2, wherein said voice processor provides voice communications between a telephone user and a machine.

* * * * *